United States Patent
Melville

(10) Patent No.: US 7,783,395 B2
(45) Date of Patent: Aug. 24, 2010

(54) STALL DETECTION

(75) Inventor: Robert George Andrew Melville, Derby (GB)

(73) Assignee: Rolls-Royce PLC, London (GB)

( * ) Notice: Subject to any disclaimer, the term of this patent is extended or adjusted under 35 U.S.C. 154(b) by 42 days.

(21) Appl. No.: 12/010,278

(22) Filed: Jan. 23, 2008

(65) Prior Publication Data

US 2008/0201030 A1 Aug. 21, 2008

(30) Foreign Application Priority Data

Feb. 16, 2007 (GB) .................... 0703128.9

(51) Int. Cl.
*G06F 17/00* (2006.01)
(52) U.S. Cl. ...................................... 701/21
(58) Field of Classification Search ............. 701/1, 701/3–5, 21
See application file for complete search history.

(56) References Cited

U.S. PATENT DOCUMENTS

| | | | |
|---|---|---|---|
| 2,960,959 A | 11/1960 | Chadwick, Jr. et al. | |
| 3,464,651 A | 9/1969 | Lightfoot | |
| 5,452,674 A * | 9/1995 | Melville et al. | ............. 114/122 |

FOREIGN PATENT DOCUMENTS

| | | |
|---|---|---|
| EP | 0 743 242 A1 | 11/1996 |
| GB | 660854 | 11/1951 |
| GB | 899252 | 6/1952 |
| GB | A 818 436 | 8/1959 |
| GB | 1 327 554 | 8/1973 |
| GB | 2 125 352 A | 3/1984 |
| JP | A-52-97599 | 8/1977 |
| WO | WO 92/20052 A1 | 11/1992 |
| WO | WO 93/00255 | 1/1993 |
| WO | WO 00/77586 A2 | 12/2000 |
| WO | WO 2006/032486 A1 | 3/2006 |

* cited by examiner

*Primary Examiner*—Kim T Nguyen
(74) *Attorney, Agent, or Firm*—Oliff & Berridge, PLC

(57) ABSTRACT

A control system for lift-generating unit, the control system comprising: detector unit for detecting at least one parameter from which stall may be calculated; scaling unit for determining a scale factor dependent on the or each detected parameter; and multiplier unit for multiplying an incoming lift demand signal by the scale factor to provide an outgoing lift demand signal.

21 Claims, 4 Drawing Sheets

Prior Art

STALL DETECTION

BACKGROUND

The present exemplary embodiment relates to a control system and method of detecting and controlling the onset and occurrence of stall in a lift-generating member. It has particular application where the lift-generating member is a stabilising fin or a steering rudder of a ship, a wing of an aircraft or a rotor blade arrangement for a helicopter.

Stabilising fins are mounted below the waterline on the hull of a ship to improve the stability of the ship, particularly in rough seas. A fin is connected into the ship via a shaft and is rotatable about its longitudinal axis to vary the angle of the fin. Usually a ship has a fin on each of the opposed sides of its hull, which are independently controlled and generally act in opposition to reduce adverse roll and pitch effects.

SUMMARY

FIG. 1 shows graphically a simplistic typical response curve for any lift-generating member and can be described in terms of a stabilising fin. The lift generated by the fin is a function of the angle of that fin, assuming that the fin angle is equivalent to its angle of attack. Angle of attack can be defined as the angle between the fin's chord and the fluid flow. In practice, the fin angle is rarely equal to its angle of attack, particularly for extended periods as waves and other effects change the angle between the fin chord and the fluid flow comparatively rapidly, and so the angle of the fin is less representative of the lift generated by the fin. For low angles, up to a value $\beta$, the lift generated increases with increasing angle. Fins are designed to operate in the region of the curve where the angles are up to $\beta$ so that a simple feedback control system, as described in more detail below, is able to adjust the angle it demands to meet the demanded lift according to an approximately linear relationship.

A simple feedback control system may be employed to vary the angle of the fin to correspond with the required lift. For example, measurement means may be positioned on the fin surface to provide a signal to the control system representative of the angle of the fin. A lookup table, a graph such as that given in FIG. 1, an algorithm or another conventional method as known in the art is used to calculate the lift from this signal. This is compared to the demanded lift and a further control signal sent accordingly. Hence, when the demanded lift is greater than the calculated lift, a control signal is sent to increase the angle of the fin and thereby increase the lift.

One problem with this method is that when the fin is stalling, for angles greater than $\beta$ as shown by region 3 in FIG. 1, increasing the angle of the fin decreases the lift produced. This means that the simple feedback control system will become unstable in stall conditions because it continues to set the angle demand according to the expected positive approximately linear relationship seen for angles below $\beta$. Hence, conventionally the fins are limited to a maximum angle a, operating in region 1 of FIG. 1, calculated to avoid stall at all predicted sea conditions to protect against the control system becoming unstable. Uncontrolled stall can result in substantially increased vibration and ship noise, higher drag and the onset of cavitation on the fin surface.

Previous systems for detecting stall of a lift-generating member have relied on providing a warning signal once the lift-generating member is in a stall condition, in region 3 of FIG. 1. An example of a stall detection system for an aerofoil is given in GB 660,854 in which a pivoted vane is secured to the leading edge of the aerofoil such that in normal conditions the air pressure differentials it experiences maintains it in a first position. When the aerofoil moves into a stall condition the air pressure across the vane cause it to pivot into a second position where it closes an electrical circuit to provide a warning signal to the aircraft pilot.

One disadvantage of this system is that the aerofoil is in a stall condition before a warning is provided to the pilot. Although later systems, such as that described in GB 1,327,554, automate a control system response, the system is required to correct an existing stall condition.

A previous system, described in GB 899,252, provides a stall warning device that includes a pressure transducer positioned on the upper surface of an aerofoil, particularly an aircraft wing, so that in non-stall conditions it is outside the turbulent boundary layer that forms adjacent to the aerofoil. When the angle of attack of the aerofoil increases sufficiently that there is a danger of stalling, turbulent peaks from the boundary layer produce pressure variations in the pressure transducer and an intermittent warning signal is produced. If the angle of attack is further increased the turbulent boundary layer engulfs the pressure transducer and produces a warning signal of increased frequency.

The present exemplary embodiment seeks to provide a novel control system for lift-generating means and a method of controlling lift-generating means that seek to address the above mentioned problems.

Accordingly the present embodiment provides a control system for lift-generating means, the control system comprising: detector means for detecting at least one parameter from which stall may be calculated; scaling means for determining a scale factor dependent on the or each detected parameter; and multiplier means for multiplying an incoming lift demand signal by the scale factor to provide an outgoing lift demand signal.

Preferably the lift-generating means is a stabilising fin for a ship. Alternatively the lift-generating means may be a steering rudder for a ship, an aircraft wing or a rotor blade arrangement for a helicopter.

Preferably the parameter is strain. Alternatively the parameter may be deflection, pressure or sound.

Preferably the detector means is at least one strain gauge. Alternatively the detector means may be at least one laser beam arrangement for detecting deflection. Alternatively the detector means may be at least one pressure gauge. Alternatively the detector means may be at least one ultrasound sensing means.

Preferably the detector means further includes receiver means for receiving the parameter.

Preferably the detector means further includes filtering means. Preferably the filtering means is at least one band-pass filter. Alternatively the filtering means may be a high-pass filter. Alternatively the filtering means may be a Fast Fourier Transform. Preferably the filtering means extracts frequencies in the range 2-100 Hz. The filtering means may extract frequencies in the range 5-20 Hz.

Preferably the detector means further includes energy estimation means. Preferably the energy estimation means is a root mean square calculation.

Preferably the scaling means includes a gain function and a summer. Preferably the summer subtracts an output of the gain function from 1. Preferably the gain function is linear. Alternatively the gain function may include hysteresis.

Alternatively the scaling means may include a gain function. Preferably the gain function is linear. Alternatively the gain function may include hysteresis.

Preferably the scale factor is between 0 and 1. Preferably the scale factor is 1 in a non-stall condition. Preferably the scale factor is 0 in a full stall condition.

Preferably the control system further includes adjustment means for adjusting the lift-generating means dependent on the outgoing lift demand signal. Alternatively the control system may further include adjustment means for deploying control surfaces dependent on the outgoing lift demand signal. Alternatively the control system may further include rotating means coupled to the lift-generating means for rotating the lift-generating means dependent on the outgoing lift demand signal.

A method of controlling lift-generating means comprising the steps of: detecting at least one parameter from which stall can be calculated; determining a scale factor dependent on the or each detected parameter; multiplying an incoming lift demand signal by the scale factor to provide an outgoing lift demand signal; and adjusting the lift-generating means dependent on the outgoing lift demand signal.

Preferably the lift-generating means is a stabilising fin for a ship. Alternatively the lift-generating means may be a steering rudder for a ship, an aircraft wing or a rotor blade arrangement for a helicopter.

Preferably the parameter is strain. Alternatively the parameter may be deflection, pressure or sound.

Preferably the method further includes the step of measuring a frequency of variation of the parameter. Alternatively the method may further include the step of measuring a magnitude of the parameter.

Preferably the method further includes the step of filtering the parameter. Preferably the filtering extracts frequencies in the range 2-100 Hz. Alternatively the filtering may extract frequencies in the range 5-20 Hz.

Preferably the method further includes the step of estimating the energy of the parameter. Preferably the estimating step is a root mean square calculation.

Preferably the scale factor is between 0 and 1. Preferably the scale factor is 1 in a non-stall condition. Preferably the scale factor is 0 in a full stall condition. Preferably the scale factor is determined from a gain function. Preferably the gain function is linear. Alternatively the gain function may include hysteresis.

Preferably the lift-generating means is adjusted by deploying control surfaces. Alternatively the lift-generating means may be adjusted by changing the angle of the lift-generating means.

BRIEF DESCRIPTION OF THE DRAWINGS

The present exemplary embodiment will be more fully described by way of example with reference to the accompanying drawings, in which.

DETAILED DESCRIPTION OF EMBODIMENTS

Figure 2:
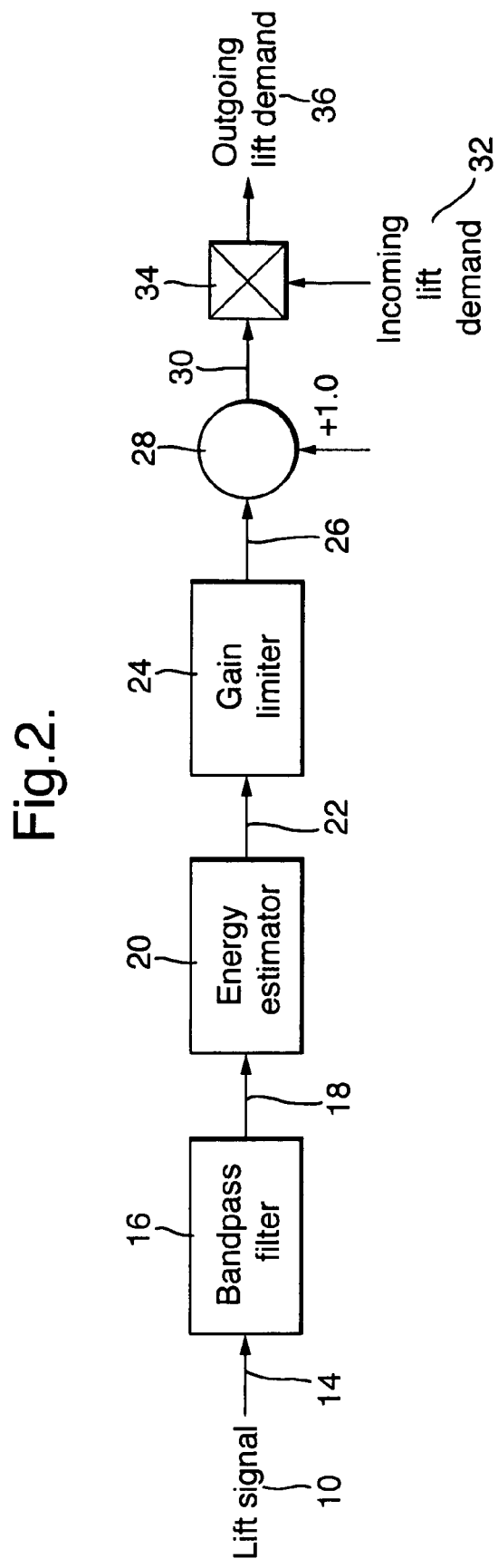
FIG. 2 is a schematic diagram of the steps of a first embodiment of the method of the present embodiment.
Figure 4:
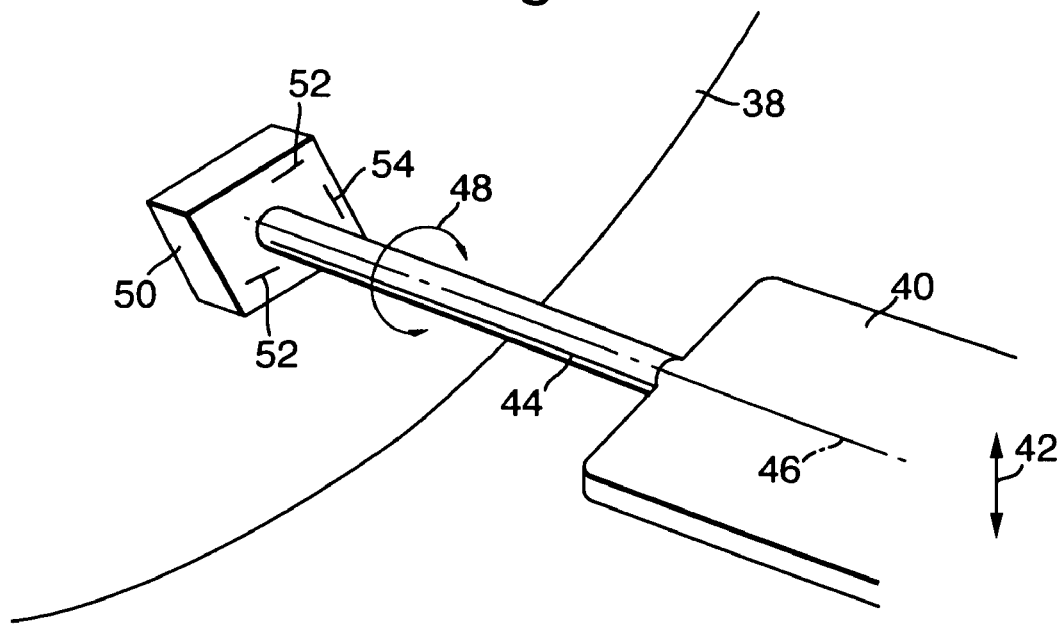
FIG. 4 is a perspective schematic drawing of a stabilising fin that generates lift and which can be controlled according to the present embodiment.

An exemplary embodiment of the method of the present embodiment is shown in FIG. 2 and will be described with reference to a stabilising fin of a ship as shown in FIG. 4 and discussed further below. One or more suitable parameters from which stall may be calculated are measured on the fin, a shaft coupling the fin to the ship's hull or a nearby component that experiences the same forces as the fin. Preferably the parameter also indicates the lift generated by the fin. For example, strain may be measured by strain gauges placed on the fin surface, the shaft or the crux to which the shaft is coupled. In a preferred embodiment, the strain gauges are located on an interior surface of the crux where they are in a controlled environment and protected from contact with seawater. It may be preferable to measure strain in two or more locations and to average the measurements to at least partially correct for noise effects caused by, for example, ship speed, water temperature and water current direction and speed. The strain is then processed to provide a lift signal 10. Additionally or alternatively, more than one parameter may be measured and combined and then processed to provide a lift signal 10.

A preferred embodiment is shown in FIG. 4 in which a stabilising fin 40 is connected into the hull 38 of a ship. Although the fin 40 is shown horizontally, the operational location of the fin 40 at the turn of the bilges on the hull 38 of the ship means there may be a downward tilt of 20°-30° of the fin 40 compared to true horizontal. This increases the moment arm between the ship's roll centre and the lift generated by the fin 40 and is therefore beneficial in correcting ship roll. Smaller fins may be positioned at an even more acute angle to true horizontal, for example up to 45°. The fin 40 generates lift perpendicular to the fin surface in the directions shown by arrows 42. The lift generated by the fin 40 is shown in both perpendicular directions 42, upwards and downwards as drawn, since this is useful lift in stabilising the ship. Generally, the fin may be angled by an equal amount about its longitudinal axis 46 in either direction from the null (usually horizontal) position to generate lift in the upward or downward direction. For other applications the lift is generated in different directions.

The fin 40 is coupled to a shaft 44 and is rotatable about its longitudinal axis 46 with or about the shaft 44, as shown by arrows 48. Typically a large fin 40 is around 8 m long in the direction of the longitudinal axis 46 and around 3 m wide in a direction mutually perpendicular to the longitudinal axis 46 and the direction of lift 42. The shaft 44 typically includes a solid high tensile steel bar having cylindrical cross-section with a diameter of around 0.75 m. Smaller fins 40 may be around 1.5 m long and proportionally narrower, coupled to a correspondingly smaller diameter shaft 44. The shaft 44 is coupled, at the opposite end to the fin 40, to a crux 50 located within the hull 38 of the ship.

At least one strain gauge 52 is located on one or more surfaces of the crux 50. FIG. 4 shows two strain gauges 52 located on the exterior of the crux 50 at positions experiencing relatively large strain when the fin 40 is generating lift. However, one or more than two strain gauges 52 may be used and these may preferably be located on one or more interior surfaces of the crux 50. Indeed, in a preferred embodiment the gauge or gauges 52 are located on an interior surface of the crux 50 to provide additional protection from the harsh operating surroundings and a known operating environment. The gauges 52 are preferably located on the interior surface of the crux 50 through which the shaft 44 extends and that is furthest outboard when the fin 44 is in its deployed position. It has been found that, although the fin 44 generates lift perpendicularly to its surface, the strain is not aligned in this direction. Instead it is aligned to the plane of the fin 44 when it is in its null lift position, approximately perpendicularly to the expected orientation.

Although the strain measured by the strain gauges 52 is large relative to the strain experienced when the fin 40 is not generating lift, the maximum measured strain is typically in the order of 100-150 μstrain. Thus a sensitive type of strain gauge 52 is required to measure the strain. The preferred type of strain gauge 52 for this application is a Fibre Bragg Grating (FBG).

Fibre Bragg Gratings are fibre optic gauges. Each grating includes a section of alternating bands of high and low refractive index that reflects a narrow band of the optical waves. The reflected wavelength varies independently with strain and temperature and so analysis of the reflections, preferably in real time, provides a temperature-dependent strain measurement. By incorporating a strain-isolated FBG a strain measurement caused by the temperature can be obtained and used to compensate the strain measurement or measurements for the temperature component. Although a single FBG can be used to obtain measurements it is simple, and often preferable, to multiplex several gratings in a single optical fibre so that measurements can be taken for a number of wavelengths.

Temperature sensors 54, for example strain-isolated FBGs as described above, are located on the crux 50 at positions experiencing very little or no strain, particularly during fin lifting. FIG. 4 shows a single temperature sensor 54 to provide a measurement to enable compensation of the strain measurements provided by the FBGs 52. However, more than one temperature sensor 54 may be provided to offer redundancy in case of failure and the ability to average measurements to improve their accuracy. Preferably the temperature sensor 54 is located at a position that experiences little or no strain so that the sensor is not damaged and measurements are not distorted by varying strain. However, if a suitable sensor 54 or sensor carrier is used, it may be located at a position that experiences strain at some or all of the time.

As described above, it is beneficial to position strain gauges or sensors 52 at locations on the crux 50 where comparatively large strains are measured when the fin 40 is generating lift. It is also crucial to align the strain gauges 52 with the strain that is caused by the lift generated by the fin 40 rather than strain caused by other factors. Finite Element Analysis (FEA), hand calculation, scale model analysis or any other suitable means known to one skilled in the art may be used to find these positions and alignments. As has been described above, the strain resulting from the lift generated by the fin 40 was found to be orientated approximately perpendicularly to the direction of that lift 42. Hence an accurate strain model is required. For example, the fin 40 may be subjected to a known lift and a strain map of the crux 50 constructed using FEA and used to identify at least one position and orientation experiencing relatively large strain for this lift condition. Further analysis can be done with the fin 40 subjected to different magnitudes and directions of lift to ensure that the at least one position identified experiences large enough strains to be measured for most lift conditions. Ideally at least two positions are identified such that for a given lift condition one position experiences a relatively large compressive strain and one position experiences a relatively large tensile strain.

Figure 1:
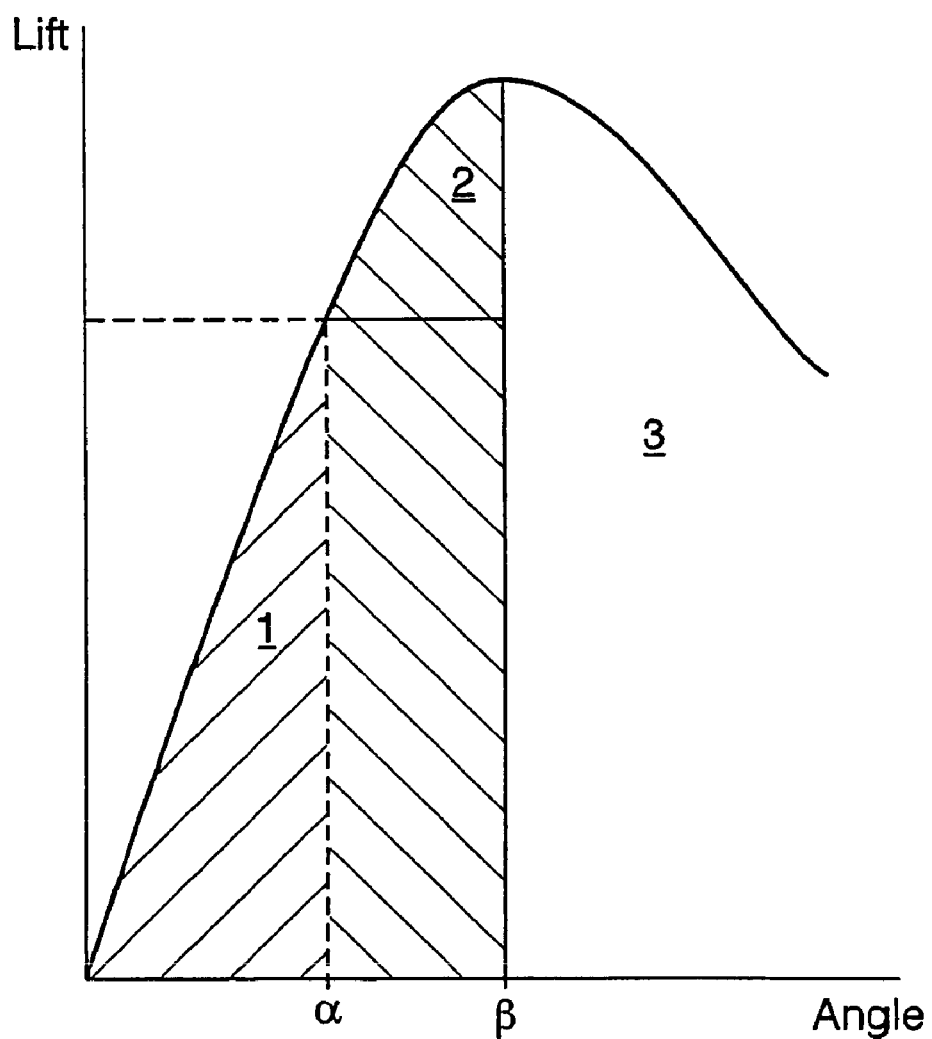
FIG. 1 shows graphically a simplistic typical response curve for any lift-generating member.

A benefit of having two sensors or groups of sensors located in these compressive and tensile positions is that by averaging the strains measured, noise effects such as current magnitude and direction can be at least partially cancelled out of the signals. This enables the strain measurements to better reflect the true lift of the fin rather than a composite lift comprising fin lift, drag, water current speed and direction, ship speed and other noise effects. Hence, at least some of the region labelled 2 in FIG. 1 can be utilised by employing the measurement method of the present embodiment. As a result, typically up to 25% more lift is available from a given fin or a correspondingly smaller fin may be used for the same maximum lift. Either of these options provides benefits in terms of ship performance and running costs as will be apparent to the skilled reader.

A further benefit of providing two sensors or groups of sensors experiencing different strains for a given conditions is that there is an amount of redundancy provided in the system. This is beneficial in case of sensor failure during operation since there is no need to effect repairs before the ship is scheduled for maintenance in dry-dock. This prevents the additional costs incurred by unscheduled dry-docking.

Temperature measurement sensors or gauges 54 are provided to enable the strain measurements to be compensated for differences in the system temperature between initial calibration and an operative state. For example, the fin 40 and crux 40 is submerged in relatively cold seawater during operation, often for extended periods of time. Hence, the overall temperature of the fin 40 and shaft 44 may be lower than when the strain gauges 52 were fitted and calibrated, for example in dry-dock. By providing temperature sensors 54 the control system can receive compensated strain measurements that more accurately reflect the true lift of the fin 40. Hence the fin 40 can be operated in region 2 of FIG. 1 with a greater degree of confidence. Only one temperature sensor 54 is required although it may be preferable to provide two or more sensors 54 to enable an average temperature to be provided and to offer a measure of redundancy in the system as previously discussed with respect to the strain gauges 52.

Figure 3:
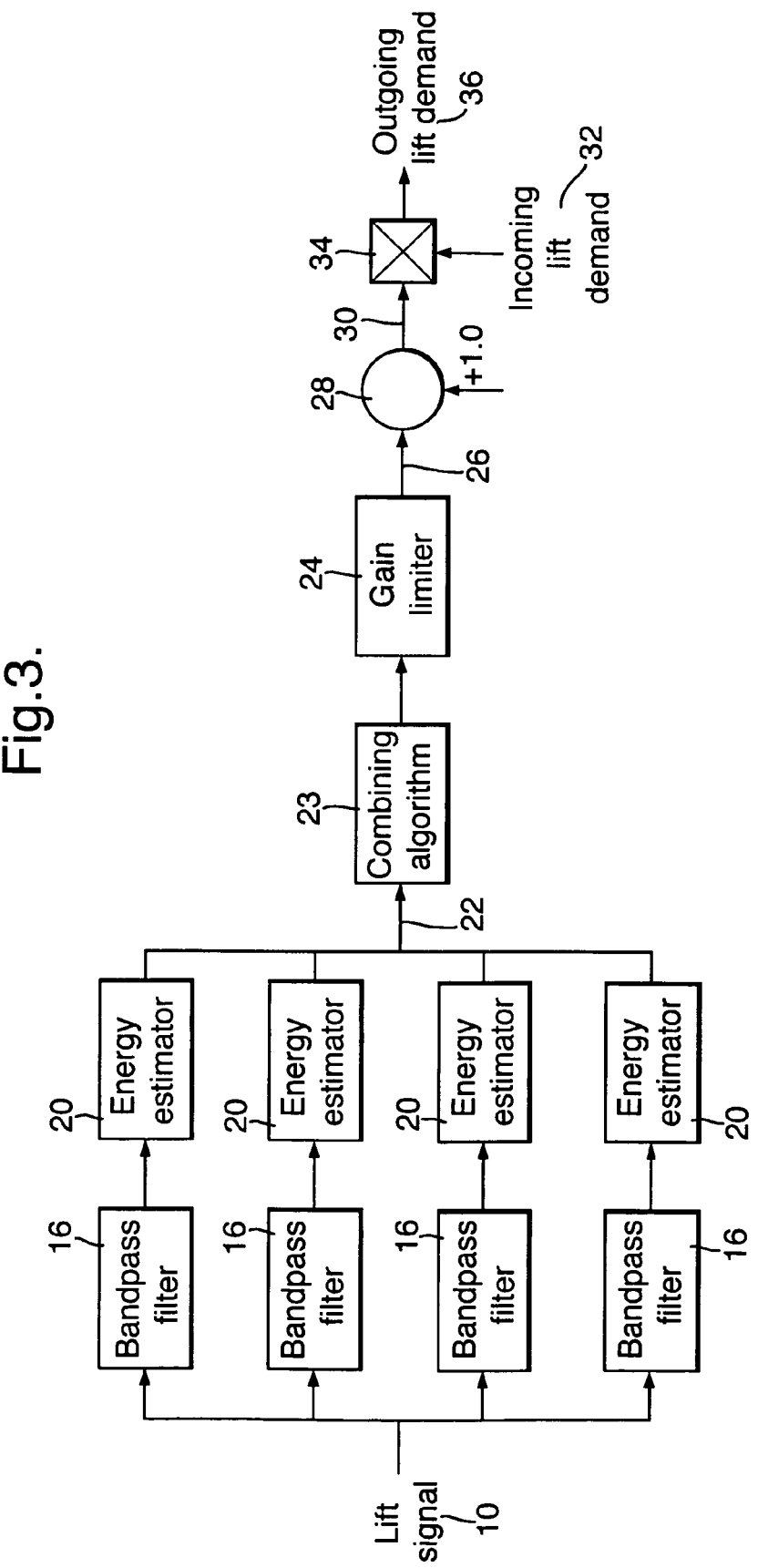
FIG. 3 is a schematic diagram of the steps of a second embodiment of the method of the present exemplary embodiment.

Referring again to FIG. 2, the lift signal 10, howsoever derived, is detected by detector means comprising a receiver (not shown) to receive the lift signal 10, filtering means and energy estimation means. Noise is generated across a broad band of frequencies. However, the geometry of the fin 40 and shaft 44 filters the noise signals to one or more narrow bands of frequencies. Therefore a band-pass filter 16 is provided to pass frequencies within the range indicating the onset or occurrence of stall in the fin 40. The band-pass filter 16 may have a range of 2-100 Hz. A preferred band-pass filter has a range of 5-20 Hz. An alternative method of filtering the noise signal is to use multiple narrow band-pass filters to pass frequencies indicating stall onset or occurrence (see FIG. 3) or to calculate a Fast Fourier Transform (FFT) that acts like multiple narrow band-pass filters.

The energy of the filtered signal 18 is estimated in an energy estimator 20. Typically a Root Mean Square (RMS) calculation is performed on the filtered signal 18 to provide an estimate of its energy. The energy estimate 22 is then passed to a gain limiter 24, which converts the incoming energy estimate 22 to a gain value dependent on its magnitude. This gain limiter 24 may take the form shown in FIG. 5 in which energy estimates up to a value $\gamma$ result in a gain of 0; energy estimates greater than $\delta$ result in a gain of 1; and energy estimates between $\gamma$ and $\delta$ are the result of a linear function of gain.

The gain signal 26 is subtracted from 1 in a summer 28, shown in FIG. 2, so that the scaling signal 30 outputted from the summer 28 tends to 1 for low energy estimates and to 0 for high energy estimates. Hence the scaling signal 30 is inversely proportional to the filtered signal 18. In an alternative embodiment the linear region of the gain function, between γ and δ, may have a negative gradient. In this case there is no requirement for a summer 28 to subtract the gain signal 26 from 1 as the gain function limits the gain signal 26 to a value between 0 and 1.

The scaling signal 30 is subsequently multiplied together with an incoming lift demand signal 32 in a multiplier 34 to produce an outgoing lift demand signal 36. The outgoing lift demand signal 36 is provided to adjustment means controlled by the control system. In the preferred embodiment, described with respect to FIG. 4, the adjustment means enable the fin 40 to be rotated about its longitudinal axis 46 to increase or decrease its angle. In other embodiments, for example an aircraft wing, the adjustment means include deployable control surfaces or flaps on the wing to increase or decrease its size or to, at least locally, alter its shape. Alternatively other control surfaces may be deployed. For example, elevators on the tail fin may be adjusted.

The outcome of the processing hereinbefore described with reference to FIG. 2 is that when the fin 40 is in a non-stall condition, the lift signal 10 does not contain parameter values that are extracted by the band-pass filter 16 and so the outgoing demand signal 36 is unmodified by the further processing steps. However, as the lift signal 10 indicates that the fin 40 is moving towards a full stall condition, parameter values are extracted by the band-pass filter 16 and passed to the further processing steps which cause the scaling signal 30 to be reduced below 1 and hence the outgoing lift demand signal 36 to reduce. This has the effect that the angle of the fin 40 is commanded to reduce to attempt to prevent lift ever reaching region 3 of FIG. 1 and the stall condition is controlled. If the fin 40 is pushed into stall, for example by a large wave, the control system continues to control the fin 40 to move it out of region 3 of FIG. 1 and into a non-stall condition. Once non-stall behaviour is indicated by the lift signal 10, the incoming lift demand signal 32 is again unmodified by the processing steps and so the outgoing lift demand signal 36 matches the incoming lift demand signal 32.

Many modifications and variations to the embodiment described are possible without departing from the scope of the exemplary embodiment as claimed. For example, although a band-pass filter 16 has been described, a high-pass filter could be substituted with equal felicity. Similarly, a suitable method of providing an energy estimate as known in the art may be used in place of RMS calculation.

Figure 5:
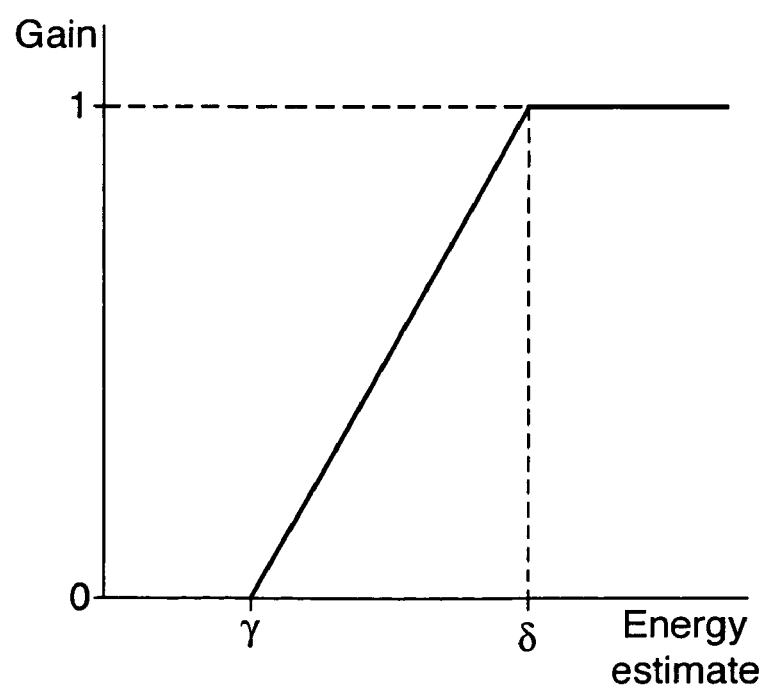
FIG. 5 is a graphical drawing of a typical gain curve for use with the method of the present embodiment.

Although the gain limiter function is shown in FIG. 5 as a linear function between specified energy estimates, it may take any suitable form. In particular, the gain function may be non-linear, such as a quadratic or logarithmic relationship, and may include compensation for hysteresis. Alternatively, multiple stages of gain may be provided instead of a single stage gain limiter.

Although the present embodiment has been described with reference to the stabilising fin of a ship, the advantages and benefits of utilising the control system and method of the present embodiment can be realised in diverse other situations in which it is desired to detect and control the onset and occurrence of stall in a lift-generating member. These may include hydrofoils such as rudders for steering ships and aerofoils such as aircraft wings, rotor blade arrangements for helicopters or rotor arrangements for wind turbines. Alternatively, the method and system of the present embodiment may be applied to other fields in which a lift-generating member is subject to stalling and it is desired to detect this and to control performance within the partially stalled condition.

Although the preferred types of strain and temperature gauges are Fibre Bragg Gratings any suitable alternative may be used without prejudice. This may particularly be the case when the present embodiment is used in alternative applications to those described herein.

Although the preferred embodiment of the present exemplary embodiment as described includes strain gauges located on the crux of a ship's stabilising fin, the benefits may also be realised by measuring strain at a different location. For example, at least one strain gauge may be located on the surface of the fin or on the shaft. A cantilever type of strain gauge may be located internally of the shaft or any other method of measuring the strain as known in the art may be used. Alternatively, it is possible to derive the advantages of the present embodiment by measuring a different parameter from which the lift generated by the fin can be calculated. For example, a multiplicity of pressure measurements may be provided from across the surface of the fin; a laser beam arrangement may be provided to determine deflection; or an ultrasonic sensor arrangement may be provided to detect differences in echoes through the fin and/or shaft.

A rudder is similar to a stabilising fin but rotated so that it is orientated to be pointing substantially vertically downwards from the hull of the ship. Its purpose is to steer the ship by developing lift in a transverse direction, approximately perpendicular to the length of the ship. Hence the lift generated by different lift-generating members is in different directions and the term lift is used to cover any of these embodiments.

I claim:

1. A method of controlling lift-generating means comprising:
   detecting at least one parameter from which stall can be calculated;
   determining a scale factor that tends to zero when the at least one detected parameter or each detected parameter indicates the onset or occurrence of stall;
   multiplying an incoming lift demand signal by the scale factor to provide an outgoing lift demand signal;
   adjusting the lift-generating means dependent on the outgoing lift demand signal,
   wherein the parameter is selected from the group consisting of strain, deflection, pressure and sound.

2. The method of claim 1, wherein the lift-generating means is a hydrofoil for a waterborne vessel or an aerofoil for an aircraft.

3. The method of claim 1, further comprising measuring a frequency of variation of the parameter.

4. The method of claim 1, further comprising measuring a magnitude of the parameter.

5. The method of claim 1, further comprising filtering the parameter.

6. The method of claim 1, further comprising estimating the energy of the parameter.

7. The method of claim 6, wherein estimating the energy includes a root mean square calculation.

8. The method of claim 1, wherein the scale factor is between 0 and 1.

9. The method of claim 1, wherein the scale factor is determined from a gain function.

10. The method of claim 9, wherein the gain function is linear or includes hysteresis.

11. The method of claim 1, wherein the lift-generating means is adjusted by deploying control surfaces.

12. The method of claim 1, wherein the lift-generating means is adjusted by changing the angle of the lift-generating means.

13. A control system for lift-generating means, comprising:
- a detector for detecting at least one parameter from which stall may be calculated;
- a scaler for determining a scale factor that tends to zero when the at least one detected parameter or each detected parameter indicates the onset or occurrence of stall;
- a multiplier for multiplying an incoming lift demand signal by the scale factor to provide an outgoing lift demand signal,
- wherein the parameter is selected from the group consisting of strain, deflection, pressure and sound.

14. The control system of claim 13 wherein the lift-generating means is a hydrofoil for a waterborne vessel or an aerofoil for an aircraft.

15. The control system of claim 13, wherein the detector further includes filtering means, selected from a group consisting of at least one band-pass filter, high-pass filter and Fast Fourier Transform, wherein the filtering means is configured to pass frequencies within a range indicating the onset or occurrence of stall.

16. The control system of claim 13, wherein the detector further includes energy estimation means.

17. The control system of claim 13, wherein the scaler includes at least one of a gain function and a summer.

18. The control system of claim 17, wherein the summer subtracts an output of the gain function from 1.

19. The control system of claim 13, wherein the scale factor is between 0 and 1.

20. The control system of claim 19, wherein the scale factor is 1 in a non-stall condition.

21. The control system of claim 19, wherein the scale factor is 0 in a full stall condition.

* * * * *